United States Patent
Makoua et al.

(10) Patent No.: US 6,327,261 B1
(45) Date of Patent: Dec. 4, 2001

(54) TRANSLATION PROCESS FOR AN ATM CELL HEADER

(75) Inventors: David Mouen Makoua, Nanterre; Pierre Dumas, Sevres, both of (FR)

(73) Assignee: Thomson CSF, Paris (FR)

( * ) Notice: Subject to any disclaimer, the term of this patent is extended or adjusted under 35 U.S.C. 154(b) by 0 days.

(21) Appl. No.: 09/117,284

(22) PCT Filed: Feb. 21, 1997

(86) PCT No.: PCT/FR97/00324

§ 371 Date: Aug. 24, 1998

§ 102(e) Date: Aug. 24, 1998

(87) PCT Pub. No.: WO97/31457

PCT Pub. Date: Aug. 28, 1997

(30) Foreign Application Priority Data

Feb. 23, 1996 (FR) .................................................. 96 02255

(51) Int. Cl.[7] ..................................................... H04L 12/56
(52) U.S. Cl. ......................... 370/392; 370/395; 370/397
(58) Field of Search ................................... 370/392, 395, 370/397, 399, 477

(56) References Cited

U.S. PATENT DOCUMENTS

| | | | | |
|---|---|---|---|---|
| 5,414,701 | * | 5/1995 | Shtayer et al. | 370/58.2 |
| 5,430,721 | | 7/1995 | Dumas et al. . | |
| 6,023,468 | * | 2/2000 | Mouen-Makoua et al. | 370/395 |
| 6,034,958 | * | 3/2000 | Wicklund | 370/395 |

FOREIGN PATENT DOCUMENTS 0 552 384 A1 * 7/1993 (EP) .

* cited by examiner

*Primary Examiner*—Melvin Marcelo
(74) *Attorney, Agent, or Firm*—Oblon, Spivak, McClelland, Maier & Neustadt, P.C.

(57) ABSTRACT

The present invention relates to a process for translating an ATM cell header for the routing thereof over a transmission highway of a communication network via an ATM switch, consisting in having the switch translate the pair (VPI, VCI) contained in the cell header, the first field VPI identifying a virtual path number and the second field VCI selecting a specified virtual channel within the virtual path.

7 Claims, 6 Drawing Sheets

TRANSLATION PROCESS FOR AN ATM CELL HEADER

Figure 1:
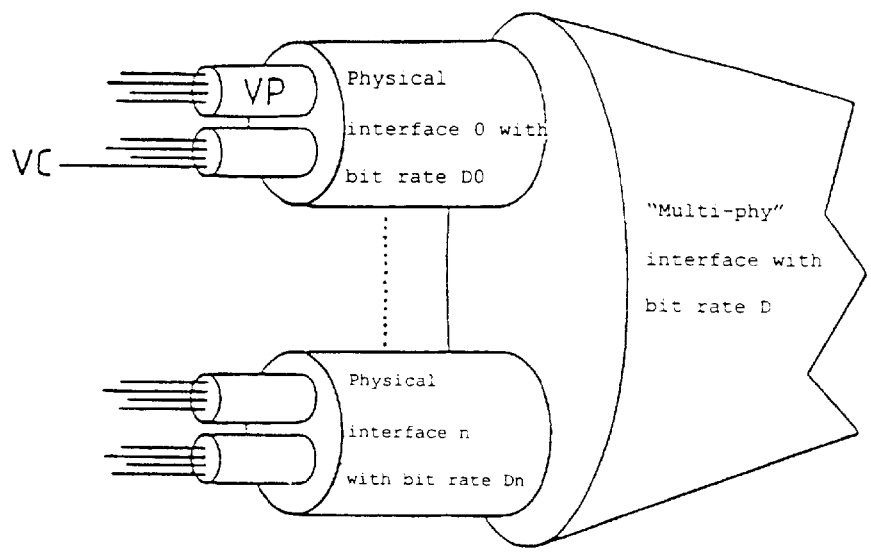

The present invention relates to a translation process for an ATM cell header and an ATM switch comprising a translation device for implementing the process according to the invention.

Studies of telecommunication systems are making ever greater calls upon a mode of transfer called ATM, standing for Asynchronous Transfer Mode. This technique makes it possible to convey digital information of a nature and bit rate which are as varied as they are irregular (for example voice, video, files). The information is transported through a network which may have various topologies (for example grid, ring, star, etc.). Each node of the network, called an ATM switch, is linked to the adjacent node by a transmission highway which accepts all types of technologies (cable, radio beam, optical fibre, etc.).

The principle of the ATM technique is to segment the data emanating from the various services into blocks of fixed length, and to add a header to this block so as to form an ATM cell. The segmentation task is activated only if the data contain useful information. Consequently, the ATM cells originating from the various sources are multiplexed and transmitted asynchronously over the transmission highway.

The routing of the cells relies on a mode per logical channel whose value is registered in the header of the ATM cell. Thus, each physical highway is logically equivalent to several paths. The ATM switches establish link-ups between these logical channels so as to form virtual routes between the ends of the network.

An essential function of an ATM switch is to be able to translate the incoming logical channel in such a way as to switch the ATM cell onto the appropriate outgoing path. This function corresponds to an operation of tagging the virtual route in each ATM switch.

The current translation processes for an ATM cell header do not take into account the new constraints which are appearing nowadays.

The shortcomings relate to the following points:
the possibility of translating the headers originating from a physical interface dubbed a "Multi-phy", and grouping together (N+1) physical interfaces of bit rate $D_0$ to $D_n$ into a physical interface of bit rate D with $D=D_0+ \ldots +D_n$.

the possibility of reducing the accesses to the translation memory for dynamically modifying the translations.

The purpose of the invention is to redress the aforementioned shortcomings.

To this end, the subject of the invention is a process for translating an ATM cell header for the routing thereof over a transmission highway of a communication network via an ATM switch, consisting in having the switch translate the pair (VPI, VCI) contained in the cell header, the first field VPI standing for Virtual Path Identifier, identifying a virtual path number and the second field VCI, standing for Virtual Channel Identifier, selecting a specified virtual channel within the virtual path, characterized in that it consists:

in a first level of indexation, in indexing a first PMD, standing for Physical Medium Device, context table comprising a specified number of contexts, in a second level of indexation, in indexing, on the basis of the first table, a second table for selecting a first mode of translation or a second mode of translation, comprising a specified number of translation mode contexts, in a third level of indexation, in indexing, on the basis of the second table, in the first mode of translation, a third table of VPI contexts comprising a specified number of translation contexts, in indexing, on the basis of the second table, in the second mode of translation, a fourth table of page pointers, organized as a specified number of ranges of pointers, and in a fourth level of indexation, in indexing, on the basis of the fourth table, a specified page of a VCI context table.

The subject of the present invention is also an ATM switch comprising a translation device for implementing the process according to the invention.

Apart from redressing the abovementioned shortcomings, the advantage of the present invention is that it allows flexibility of use in terms of manipulation of the data structures (that is to say pointers and contexts) as well as the capability of matching between translation performance and the size of the memories used. The term context is understood to mean all of the data characterizing a link or a subset of ATM links.

The process according to the invention must be able to be satisfied with a memory size imposed by "On-chip" integration, that is to say a memory which is "small" enough (in terms of memory size) to be integrated into the same chip as the ATM component, which therefore amounts to a low-cost system, naturally with reduced translation possibilities, whilst however permitting the translation possibilities to be extended by adding "Off-chip" memories, that is to say memories outside the chip.

Figure 2:
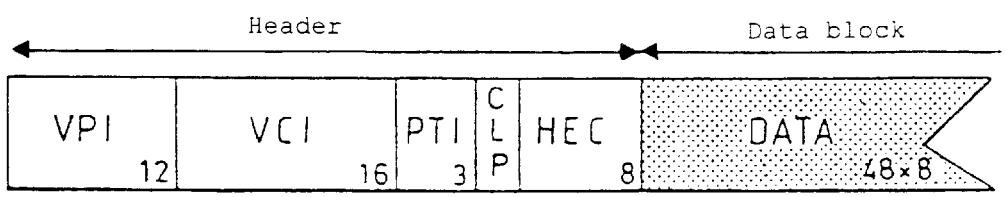
Figure 3:
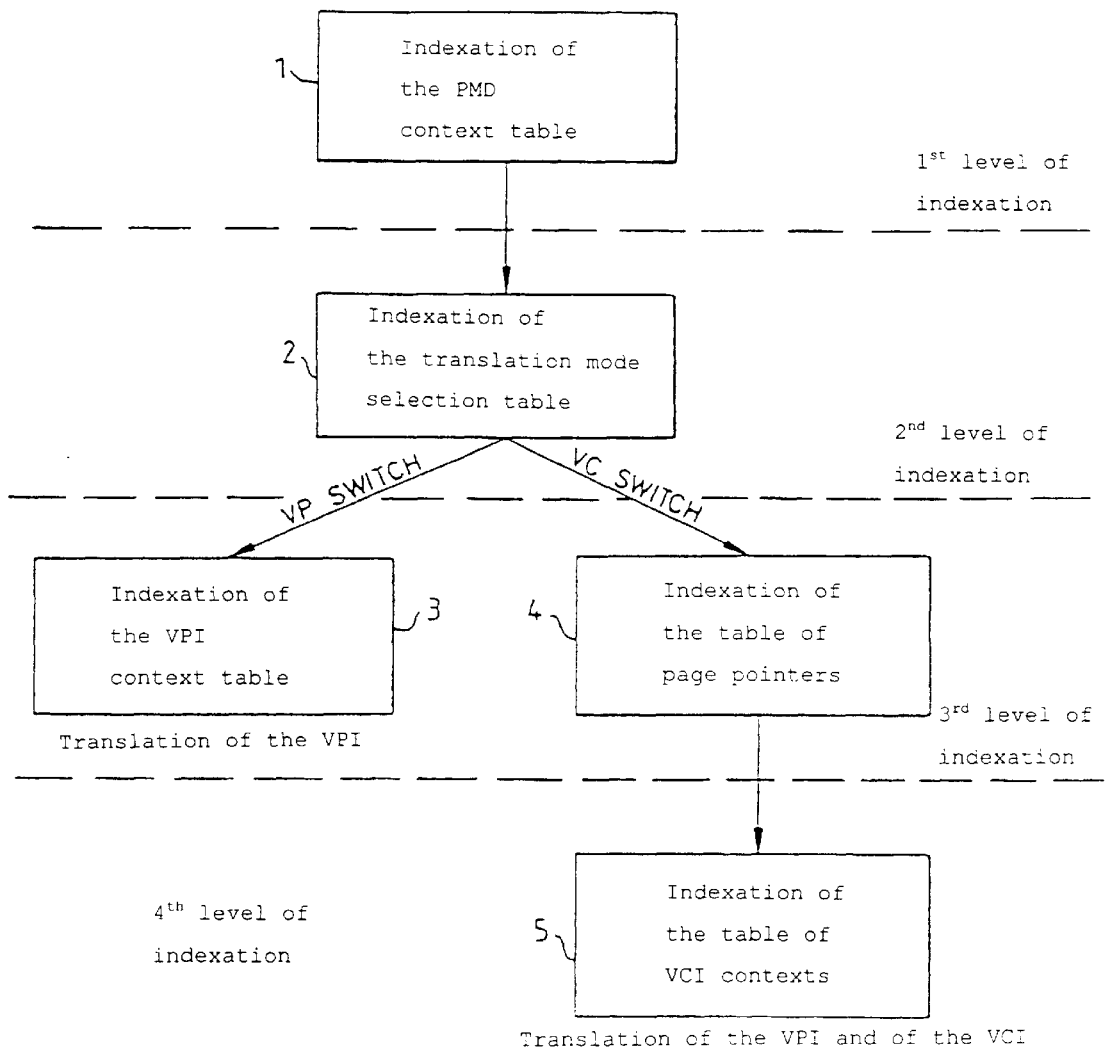
Figure 4:
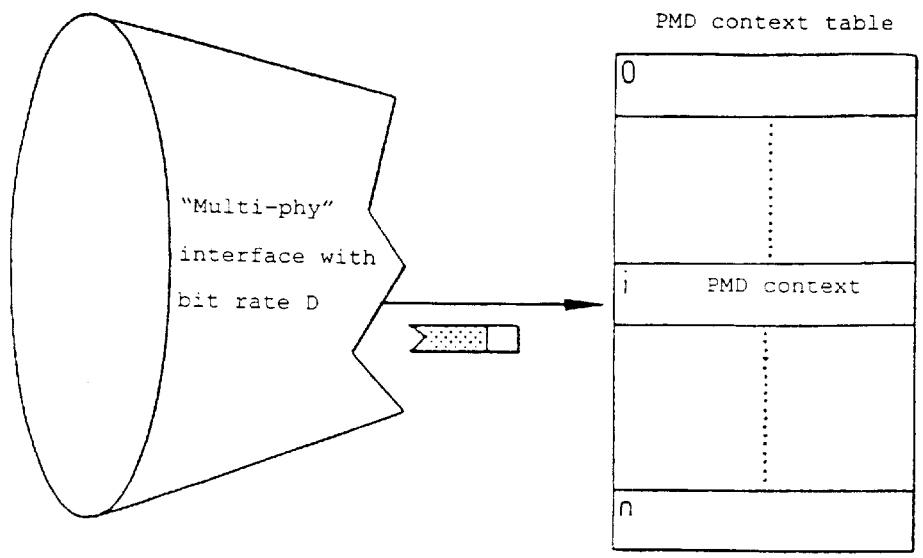
Figure 5:
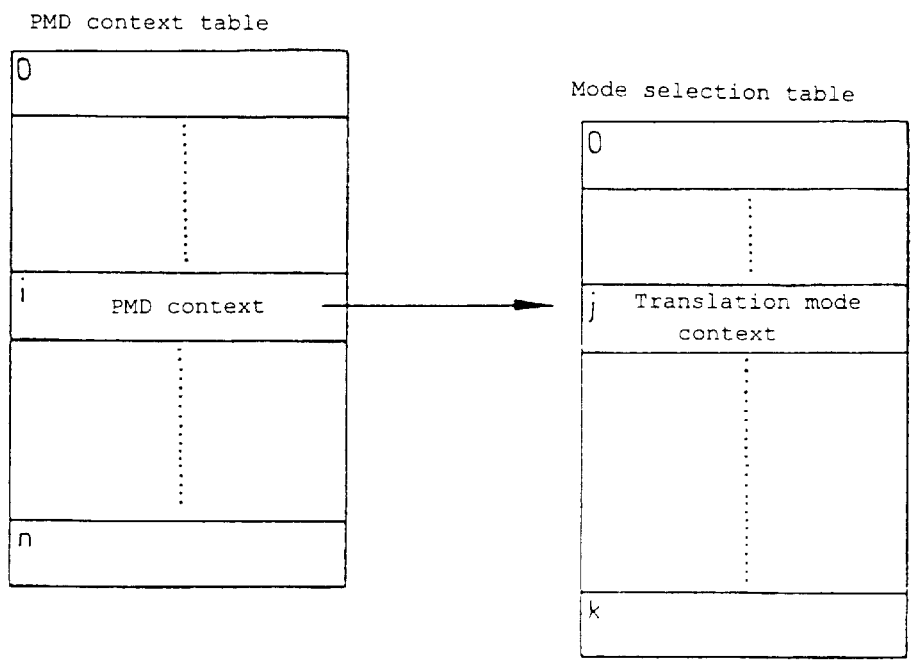
Figure 6:
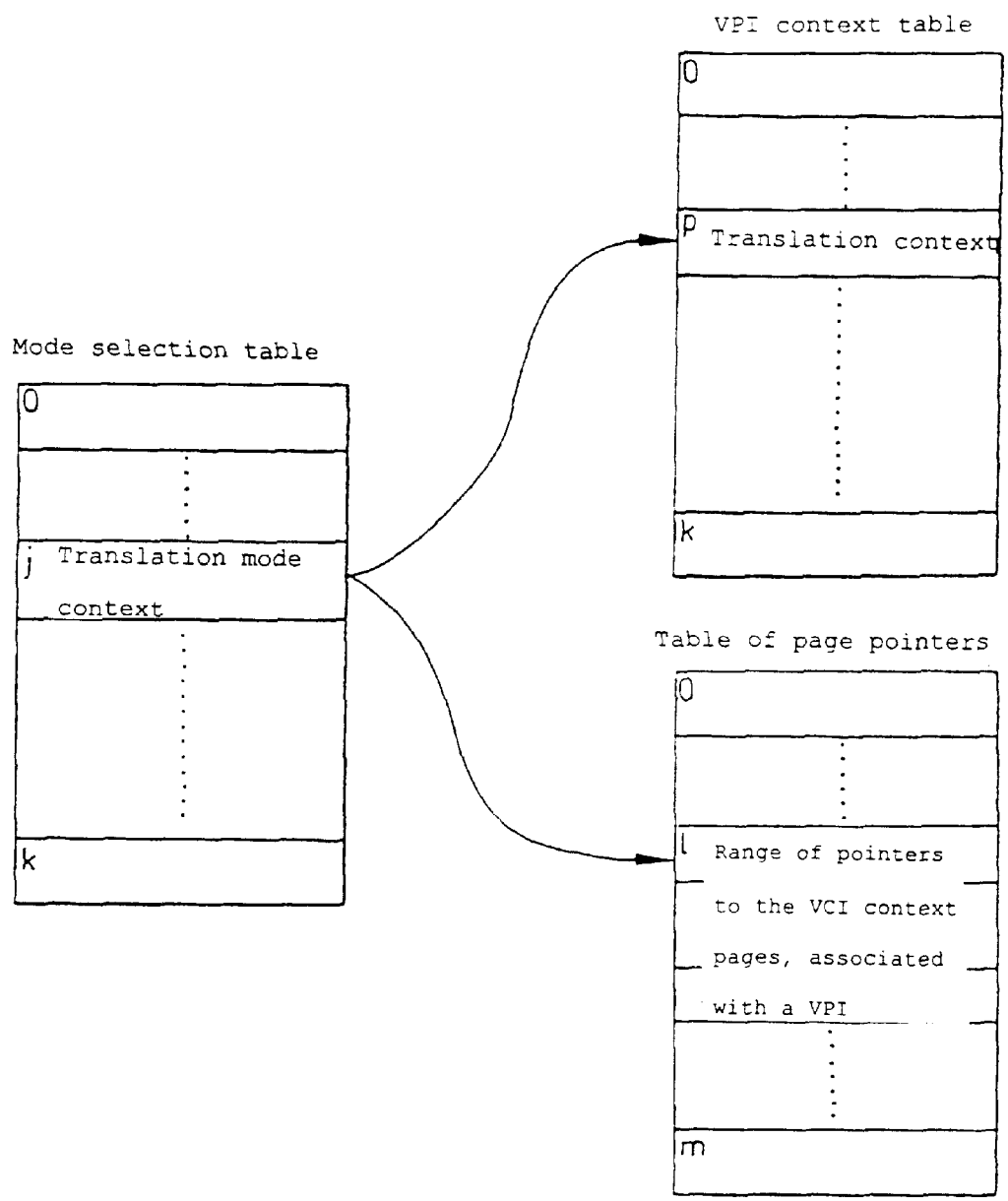
Figure 7:
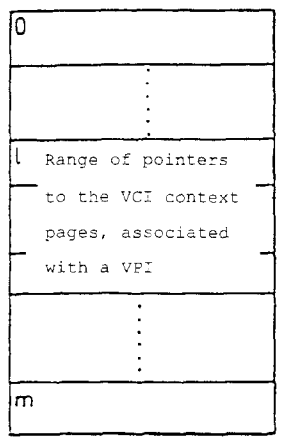
Figure 7:
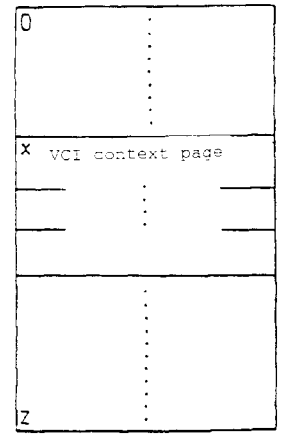
Figure 8:
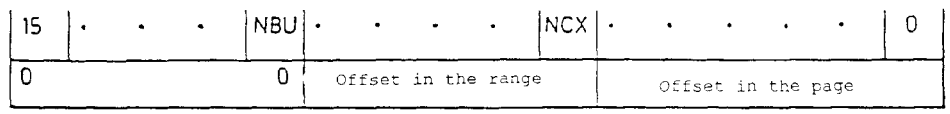
Figure 9:
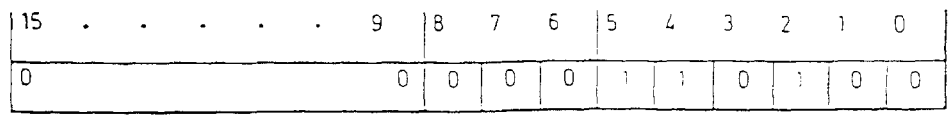
Figure 10:
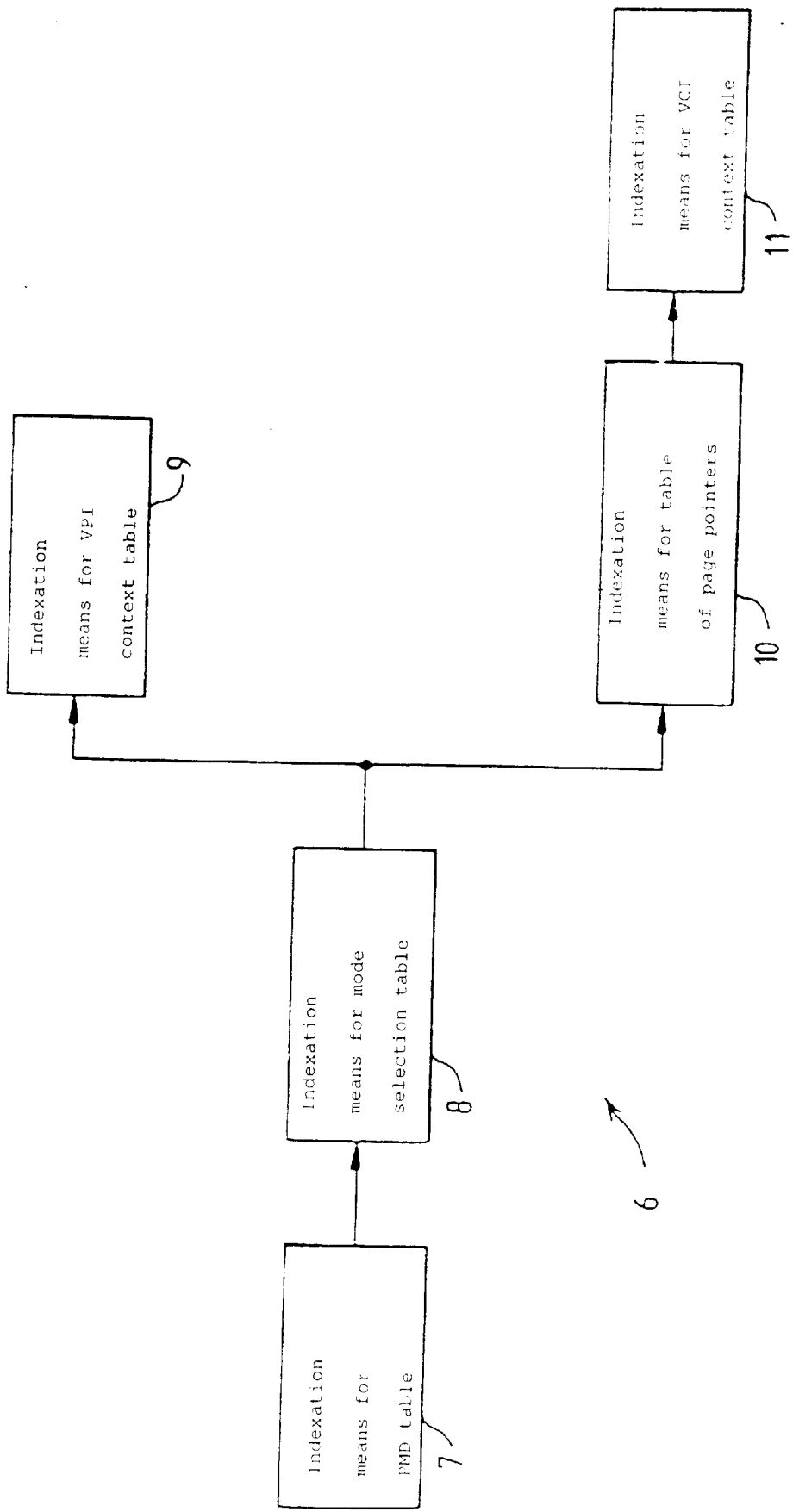

Other advantages and characteristics of the present invention will emerge more clearly on reading the following description and the appended figures which represent:

FIG. 1, a basic diagram of a "Multi-phy" physical interface,

FIG. 2, the structure of an ATM cell,

FIG. 3, a block diagram of the main steps of the process according to the invention, FIG. 4, a basic diagram of the first level of indexation of the translation process according to the invention, FIG. 5, a basic diagram of the second level of indexation of the translation process according to the invention, FIG. 6, a basic diagram of the third level of indexation of the translation process according to the invention, FIG. 7, a basic diagram of the fourth level of indexation of the translation process according to the invention, FIG. 8, the general format of a VCI, FIG. 9, the format of a VCI, for NCX=6 and NBU=9, and FIG. 10, a block diagram of a translation device for the implementation of the process according to the invention.

Globally, the translation process according to the invention is based on a principle of tables, in which one serves to index the next. Thus, to solve the problems relating to "Multi-phy", and the dynamic modifying of the tags, two additional levels of indexation are added to the known translation procedures, i.e. two tables which in the remainder of the document are called respectively the "PMD context table", corresponding to the port for accessing the "Multi-phy" interface of the incoming ATM cell and the "Table of page pointers". A memory expansion bus may make it possible to open up the possibilities towards an "Off-chip" solution.

FIG. 1 diagrammatically illustrates the "Multi-phy" physical interface principle.

An ATM cell crossing this interface is composed of a header of five bytes and of a block of useful data of forty-eight bytes. The structure of such a cell is illustrated in FIG. 2.

The pair (VPI, VSI) transports the logical channel number. The VPI field identifies the virtual path number. The VCI field selects a virtual channel within the path. While crossing through an ATM switch, the incoming pair (VPI, VCI) undergoes translation.

Two cases should be distinguished:

only the value of VPI is modified. This mode is called the "VP switch". It makes it possible to change path without modifying the contents thereof. The tags of the virtual channels are unchanged;

the values of VPI and VCI are modified. This mode is called the "VC switch". It allows a communication to change virtual channel.

The translation process according to the invention relates only to the first twenty-eight bits of the header. Consequently, the fields PTI, standing for Payload Type Identifier, giving information about the nature of the data block, CLP, standing for Cell Loss Priority, aiding the control of decongestion, HEC, standing for Header Error Control used for correcting the errors in the header, and the block of useful data are not detailed in what follows.

To describe the invention, a progressive journey will be made through the translation tables and the various indexations, like that made by an incoming ATM cell in a translation device of an ATM switch.

FIG. 3 illustrates through a block diagram the main steps of the process according to the invention. Each step of the process corresponds to a level of indexation of a specified table, each table pointing to the next.

In the first level of indexation 1, a first PMD context table comprising a specified number of contexts is indexed.

In the second level of indexation 2, on the basis of the first table, a second table for selecting a first mode of translation (VP switch) or a second mode of translation (VC switch), comprising a specified number of mode of translation contexts is indexed.

In the third level of indexation 3, on the basis of the second table, in the first mode of translation (VP switch), a third table of VPI contexts comprising a specified number (0 to k) of translation contexts is indexed, and on the basis of the second table, in the second mode of translation (VC switch), a fourth table of page pointers organized as a specified number of ranges of pointers.

In the fourth level of indexation 5, on the basis of the fourth table, a specified page of a table of VCI contexts is indexed.

The first level of indexation of the translation process according to the invention is illustrated in FIG. 4.

An incoming ATM cell is accompanied by its port number i, with $0 \leq i \leq n$ (each port corresponding to a physical interface of specified bit rate, as illustrated in FIG. 1). The port number i serves as index for the PMD context table. This table has n elements.

Each context of the PMD context table has the following structure:

| Context enable [1] | Number of useful bits in the VPI [4] | pointer to the node selection table [32] |
| --- | --- | --- |

In this structure, as well as for the following structures, the number of bits allocated to each field of the context appears between square brackets.

The "context enable" bit makes it possible to accept or not accept the translations on the associated physical interface. This possibility allows the rejection of translations during initialization of the contexts. The next four bits indicate the number of useful bits (from 0 to 12) in the VPI. If the number of useful bits is equal to zero, then the value of the VPI is set to zero. This makes it possible to accept all the values of the VPI on a given connection and to effect a translation on the basis of the context associated with the VPI 0. The last field of the context is a pointer to the next table called the "mode selection table".

The second level of indexation of the translation, points to the mode selection table. This table selects the translation mode: "VP switch" or "VC switch". This second level of indexation is illustrated in FIG. 5.

Each context of the mode selection table has the following structure:

| Context enable [1] | Number of useful bits in the VCI [5] | pointer to the next table [16] |
| --- | --- | --- |

The context enable bit makes it possible to accept or not accept the translations. The next five bits Indicate the number of useful bits (from 0 to 16) in the VCI. A number of useful bits equal to zero selects the "VP switch" mode. A number of useful bits different from zero selects the "VC switch" mode. The last field of the context allows a third level of indexation with two directions:

in "VP switch" mode the last field is a pointer to the "VPI context table", in "VC switch" mode the last field is a pointer to the "Table of page pointers".

FIG. 6 illustrates the third level of indexation.

In "VD switch" mode the VPI context table shuts down the translation process. All the elements necessary for the translation are included within the translation context. The translation context has the following structure:

| Context enable [1] | translated value of the VPI [12] | Internal header [a] | Internal direction [b] | Internal control [c] |
| --- | --- | --- | --- | --- |

The context enable bit makes it possible to accept or not accept the translations. The next twelve bits give the translated value of the VPI (in "VP switch" mode the remainder of the ATM header is unchanged). The remainder of the context is "proprietary", that is to say it relates to the internal management of a specified item of equipment. It makes it possible for example:

to add [a] a proprietary header to the cell to aid its course through the ATM switch, to indicate [b] an internal direction: for example the number of the output highway junctor, to carry out [c] control on the cells: for example, Usage Parameter Control (UPC), Operation and Maintenance (OAM) as demanded by the ATM standards.

The table of VPI contexts has the same number of contexts as the mode selection table.

In "VC switch" mode there is a fourth level of indexation, as illustrated in FIG. 7.

The "VCI context table" is organized into pages. Each page of this table contains $2^{NCX}$ translation contexts (NCX is defined in a control register (not described)). The context of the mode selection table contains a pointer to a range containing all the pointers to the pages used for the translations associated with a specified VPI, the pages not necessarily being contiguous. A context is selected on the basis: of the pointer to the range, of an offset in the range which gives the pointer to the page of translation contexts, and of the offset in the page which indicates the translation context. The two offsets depend on the number of useful bits in the VCI. This method has the following advantages:

the VCI "slots" can vary from one VPI to another,
a straightforward manipulation of pointers makes it possible to add or remove VCI "slots" for a specified VPI.

A slot denotes one or more pages of contexts.

The format of the VCI is illustrated in FIG. 8.

In the incoming cell, the VCI must have those bits lying between NBU (Number of Useful Bits) and 15 set to zero (imposed by the ATM standard). Otherwise, the cell is rejected.

By way of non-limiting example, for $2^{NCX}=64$, a page contains sixty-four translation contexts, NCX=6, NBU=9, the relevant range contains $2^{(NBU-NCX)}=8$ page pointers to a total of eight pages of sixty-four contexts, i.e. five hundred and twelve contexts.

VCI=34 h (in hexadecimal code) selects the $52^{nd}$ context of page 0, as illustrated in FIG. 9.

A VCI context table translation context has the following structure:

| Context enable [1] | translated value of the VPI and of the VCI [12] | Internal header [a] | Internal direction [b] | Internal control [c] |
|---|---|---|---|---|

The context enable bit makes it possible to accept or not accept the translations. The next twenty-eight bits give the translated value of the VPI and of the VCI. The remainder of the context is identical to the context of the "VP switch" mode.

FIG. 10 illustrates the block diagram of a translation device for implementing the process according to the invention. The translation device according to the invention is built into an ATM switch comprising a translation device for implementing the process, characterized in that the translation device comprises:

means for indexing, in a first level of indexation, a first PMD context table comprising a specified number of contexts, means for indexing, in a second level of indexation, on the basis of the first table, a second table for selecting a first mode of translation (VP switch) or a second mode of translation (VC switch), comprising a specified number of mode contexts, means for indexing, in a third level of indexation, on the basis of the second table, in the first mode of translation (VP switch), a third VPI context table comprising a specified number of translation contexts, means for indexing on the basis of the second table, in the second mode of translation (VC switch), a fourth table of page pointers organized as a specified number of ranges of pointers, and means for indexing, in a fourth level of indexation, on the basis of the fourth table, a specified page of a VCI context table.

The indexation means respectively relating to the four levels of indexation of the process according to the invention can be embodied with the aid of hardware connection means.

What is claimed is:

1. Process for translating an ATM cell header for the routing thereof over a transmission highway of a communication network via an ATM switch, consisting in having the switch translate the pair (VPI, VCI) contained in the cell header and constituting the ATM address of the cell, the first field VPI identifying a virtual path number and the second field VCI selecting a specified virtual channel within the virtual path, by carrying out successive indexations by means of five tables so as to culminate in an address compression, characterized in that it consists:

in allowing a translation of the first field VPI of the header of the cell irrespective of its value by means of a field of the contexts contained in the first table (PMD context table) defining the number of useful bits of the first field VPI, in selecting a first mode of translation (VP switch) or a second mode of translation (VC switch) by means of a field of the contexts contained in the second table (mode selection table) defining the number of useful bits (NBU) of the second field VCI of the cell header, this field consisting of a first field defining a first pointer shift and of a second field defining a second pointer shift, in the second mode of translation (VC switch) in organizing the fifth table (VCI context table) into pages containing the translation values of the pair (VPI, VCI), each page being associated with a specified value of the first field VPI of the header of a cell and each page being addressed by a pointer contained in the fourth gable (table of page pointers), itself addressed by a pointer contained in the second table (mode selection table).

2. Process according to claim 1, characterized in that it consists in indexing (1), via the port number (i) which accompanies the cell as input to the ATM switch, one context from among a specified number of contexts (0 to n) of the first table (PMD context table), each context comprising a first context enable field, a second field defining the number of useful bits of the first field VPI of the header of a cell and a third field containing a table pointer.

3. Process according to claim 2, characterized in that it consists in indexing (2), via the table pointer contained in the indexed context of the first table (PMD context table), one context from among a specified number of mode contexts (0 to k) contained in the second table (mode selection table), each mode context comprising a first context enable field, a second field defining the number of useful bits (NBU) of the second field VCI of the header of a cell and a third field containing a table pointer.

4. Process according to claim 3, characterized in that it consists, after selecting the first mode of translation (VP switch), in indexing (3), via the table pointer contained in the indexed context of the second table (mode selection table), one translation context from among a specified number of translation contexts (0 to k) contained in the third table (VPI context table), each translation context comprising a first context enable field, a second field indicating the translated value of the first field VPI of the header of a cell, the remainder of the context allowing internal management of the cell.

5. Process according to claim 3, characterized in that it consists, after selecting the second mode of translation (VC switch), in indexing (4), via the table pointer contained in the indexed context of the second table (mode selection table), one specified range from among a specified number (0 to m) of variable ranges contained in the fourth table (table of page pointers), each range containing all the pointers pointing to the pages of the fifth table (VCI context table) which are associated with the same value of the first field VPI of the cell header, and in that it consists in indexing (4) via the first pointer shift a specified pointer of the specified range.

6. Process according to claim 5, characterized in that it consists in indexing (5), via the specified pointer of the specified range, a specified page of the fifth table (VCI context table), each page containing a specified number ($2^{NCX}$) of translation contexts each comprising a first context enable field, a second field indicating the translated values of the first field VPI and of the second field VCI of the header of a cell and of other fields allowing internal management of the cell and in that it consists in indexing (5) via the second pointer shift one translation context from among the translation contexts of the specified page.

7. ATM switch comprising a translation device (6) for implementing the process according to claim 6, characterized in that the translation device (6) comprises:

means (7) for indexing, in a first level of indexation, a first table (PMD context table) comprising a specified number (0 to n) of contexts, means (8) for indexing, in a second level of indexation, on the basis of the first table, (PMD context table), a second table (mode selection table), comprising a specified number (0 to k) of mode contexts, making it possible to select a first mode of translation (VP switch) and a second mode of translation (VC switch), means (9) for indexing, in a third level of indexation, on the basis of the second table (mode selection table), in the first mode of translation (VP switch), a third table (VPI context table) comprising a specified number (0 to k) of translation contexts, means (10) for indexing on the basis of the second table (mode selection table), in the second mode of translation (VC switch), a fourth table (table of page pointers) organized as a specified number (0 to m) of ranges of pointers, and means (11) for indexing, in a fourth level of indexation, on the basis of the fourth table (table of page pointers), a specified page of a fifth table (VCI context table).

* * * * *